US008917610B2

(12) United States Patent
Astigarraga et al.

(10) Patent No.: US 8,917,610 B2
(45) Date of Patent: Dec. 23, 2014

(54) DETECTING INTERMITTENT NETWORK LINK FAILURES (75) Inventors: Tara Astigarraga, Tucson, AZ (US); Louie A. Dickens, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 12/834,599

(22) Filed: Jul. 12, 2010

(65) Prior Publication Data

US 2012/0008506 A1 Jan. 12, 2012

(51) Int. Cl.
*H04L 12/26* (2006.01)
*H04L 12/24* (2006.01)

(52) U.S. Cl.
CPC ............ *H04L 43/10* (2013.01); *H04L 41/0677* (2013.01); *H04L 43/0811* (2013.01)
USPC ........... 370/242; 370/216; 370/252; 370/256; 370/380; 711/104

(58) Field of Classification Search
USPC ......................................................... 370/242
See application file for complete search history.

(56) References Cited

U.S. PATENT DOCUMENTS

| | | | | |
|---|---|---|---|---|
| 6,363,495 | B1* | 3/2002 | MacKenzie et al. | 714/4.5 |
| 2002/0069317 | A1* | 6/2002 | Chow et al. | 711/104 |
| 2005/0089027 | A1* | 4/2005 | Colton | 370/380 |
| 2006/0003784 | A1* | 1/2006 | Chion et al. | 455/518 |
| 2006/0062141 | A1* | 3/2006 | Oran | 370/216 |
| 2008/0232276 | A1* | 9/2008 | Guntur et al. | 370/256 |
| 2009/0046573 | A1* | 2/2009 | Damnjanovic | 370/216 |
| 2009/0245120 | A1* | 10/2009 | Jones | 370/252 |
| 2011/0116385 | A1* | 5/2011 | Turlington et al. | 370/242 |

* cited by examiner

*Primary Examiner* — Phirin Sam
*Assistant Examiner* — Hai-Chang Hsiung
(74) *Attorney, Agent, or Firm* — Kunzler Law Group (57) ABSTRACT An apparatus, system, and method are disclosed for detecting intermittent network link failures. A tracking module tracks link failures of a network link of a network over a specified time interval. A failure module determines the network link is failing in response to a number of link failures exceeding a specified failure threshold. A mitigation module mitigates communications over the network link.

14 Claims, 6 Drawing Sheets

DETECTING INTERMITTENT NETWORK LINK FAILURES

BACKGROUND

1. Field

The subject matter disclosed herein relates to detecting network failures and more particularly relates to detecting intermittent link failures.

2. Description of the Related Art

Networks are used to communicate data between multiple devices. A network will typically include a plurality of nodes, with network links between the nodes. Data may move from node to network link to node until the data arrives at a destination node.

If a network link between nodes fails, the data may be unable to reach a destination node. This is particularly true in a loop-free topology. As a result, networks often employ failure detection algorithms to detect the failure of network links.

In addition to a complete failure, a network link may fail intermittently. Such intermittent failures may not be detected by failure detection algorithms as the failure ends and the network link resumes transmitting data. As a result, no corrective action may be taken, although network link performance may be degraded or unreliable.

BRIEF SUMMARY

From the foregoing discussion, it should be apparent that a need exists for an apparatus, system, and method that detect intermittent network link failures. Beneficially, such an apparatus, system, and method would detect unreliable and degraded network links.

The present invention has been developed in response to the present state of the art, and in particular, in response to the problems and needs in the art that have not yet been fully solved by currently available network link failure detection methods. Accordingly, the present invention has been developed to provide an apparatus, system, and method for detecting intermittent network link failures that overcome many or all of the above-discussed shortcomings in the art.

The apparatus for detecting intermittent network link failures is provided with a plurality of modules configured to functionally execute the necessary steps of tracking link failures, determining a network link is failing, and mitigating communications. These modules in the described embodiments include a tracking module, a failure module, and a mitigation module.

The tracking module tracks link failures of a network link of a network over a specified time interval. The failure module determines the network link is failing in response to a number of link failures exceeding a specified failure threshold. The mitigation module mitigates communications over the network link.

A system of the present invention is also presented to detect intermittent network link failures. The system may be embodied in an Ethernet network. In particular, the system, in one embodiment, includes a network and a data processing device.

The data processing device is in communication with the network. The data processing device includes a tracking module, a failure module, and a mitigation module. The tracking module tracks link failures of a network link of a network over a specified time interval. The failure module determines the network link is failing in response to a number of link failures exceeding a specified failure threshold. The mitigation module mitigates communications over the network link.

A method of the present invention is also presented for detecting intermittent network link failures. The method in the disclosed embodiments substantially includes the steps necessary to carry out the functions presented above with respect to the operation of the described apparatus and system.

A tracking module tracks link failures of a network link of a network over a specified time interval. A failure module determines the network link is failing in response to a number of link failures exceeding a specified failure threshold. A mitigation module mitigates communications over the network link.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium.

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
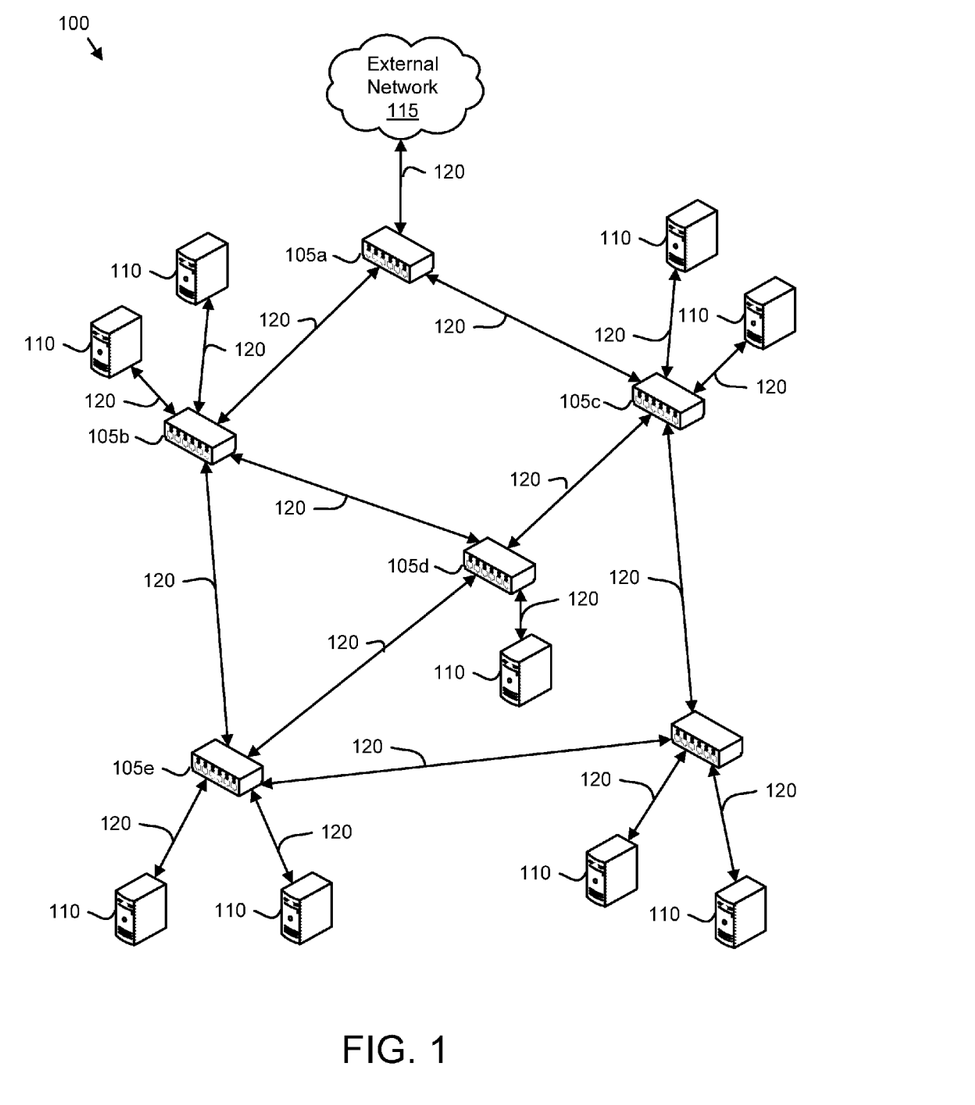
FIG. 1 is a schematic block diagram illustrating one embodiment of a network.

FIG. 1 is a schematic block diagram illustrating one embodiment of a network 100. The network 100 includes a plurality of nodes 105. The nodes 105 may be routers, bridges, and the like. The nodes 105 are in communication via network links 120. One or more data processing devices 110 may be in communication with the network 100 through the nodes 105. The network 100 may also be in communication with an external network 115 through a first node 105*a*.

In one embodiment, the network 100 is an Ethernet network. The Ethernet network may be selected from the group consisting of a one Gigabit Fiber Channel over Ethernet (FCoE) network, a ten Gigabit FCoE network, an Internet Small Computer System Interface (iSCSI) network, a Hyper Small Computer System Interface (HyperSCSI) network, and an Advanced Technology Attachment (ATA) over Ethernet (AoE) network, and the like.

In one embodiment, the network links 120 employs transport medium selected from the group consisting of a fiber optic transport medium, a copper transport medium, and a wireless transport medium. In an alternate embodiment, the network links 120 employ a combination of two of more of the fiber optic transport medium, the copper transport medium, and the wireless transport medium.

In one embodiment, the network 100 may be organized as a loop-free topology. For example, the network 100 may be organized as mesh of connected nodes 105 with a single active path between any two nodes 105. Network links 120 that result in loops in the network 100 are disabled. In one embodiment, the network 100 employs a spanning tree protocol to remove loops from the network 100. The spanning tree protocol may be a Digital Equipment Corporation Spanning Tree Protocol (DEC STP), Institute of Electrical and Electronic Engineers (IEEE) Rapid Spanning Tree Protocol (RSTP), per-VLAN spanning tree (PVST), Multiple Spanning Tree Protocol (MSPT), Rapid per-VLAN spanning tree (R-PVST), and the like.

Tests for a failed network link typically send test messages, referred to hereafter as heartbeat messages, to determine if a network link 120 is still operating or is failed. If the heartbeat messages are not received, a test may determine that the network link 120 is failed. However, a network link 120 may intermittently fail. If the network link 120 intermittently fails then occasionally a heartbeat message will be successfully communicated across the network link 120. As a result, a test may not discover that the network link 120 is operating with intermittent failures.

Figure 2:
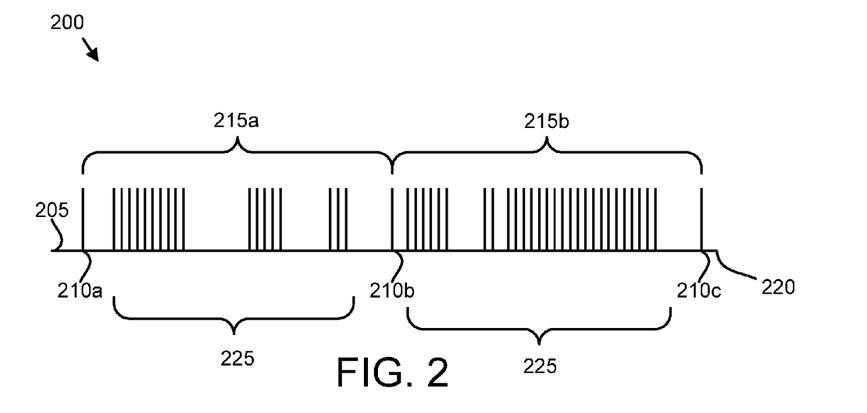
FIG. 2 is a schematic diagram illustrating one embodiment of a timeline of network communications.

FIG. 2 is a schematic diagram illustrating one embodiment of a timeline 200 of network communications. The timeline 200 shows the transmission of exemplary messages 210, 225 between a start time 205 and an end time 220. The messages 210, 225 may be communicated over the network 100 of FIG. 1. The description of the timeline 200 refers to elements of FIG. 1, like numbers referring to like elements.

The messages 210, 225 include heartbeat messages 210 and data messages 225. The messages 210, 225 may be sent as packets as is well known to those skilled in the art.

In one embodiment, a heartbeat message 210 is sent after each heartbeat time interval 215. In a certain embodiment, a specified number of heartbeat messages 210 are sent during each specified time interval. The specified time interval may be in the range of 6 to 18 seconds.

Figure 3:
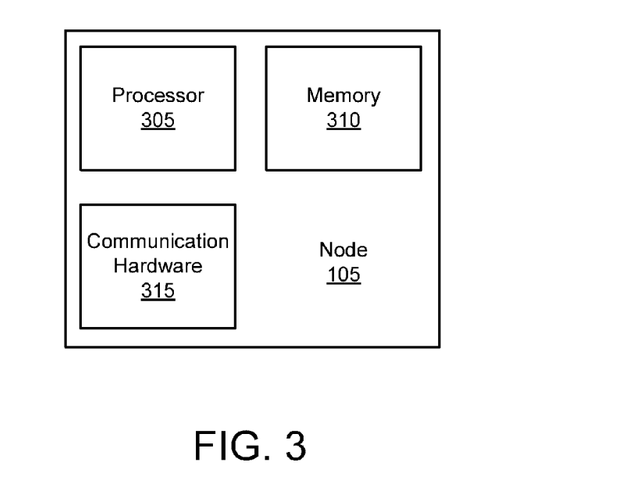
FIG. 3 is a schematic block diagram illustrating one embodiment of a node.

FIG. 3 is a schematic block diagram illustrating one embodiment of a node 105. The node 105 may be the node 105 FIG. 1. The description of the node 105 refers to elements of FIGS. 1 and 2, like numbers referring to like elements. The node 105 includes a processor 305, a memory 310, and communication hardware 315.

The memory 310 stores a computer readable program. The computer readable program may comprise instruction code and data. The memory 310 may be configured as a semiconductor memory, a hard disk drive, and optical storage medium, a micromechanical storage medium, and the like. In one embodiment, the memory 310 is a computer readable storage medium.

The processor 305 executes the computer readable program. The computer readable program may manage the communication of messages 210, 225 over the network links 120. The communication hardware 315 may comprise connectors, semiconductor logic, and the like. The communication hardware 315 may send and receive messages 210, 225 over the network links 120.

In one embodiment, the communication hardware 315 embodies a network layer 1. In addition, the computer readable programs may embody a network layer 2. The network layer 1 may be a physical layer. In addition, the network layer 2 may be a data layer.

In one embodiment, the network layer 1 is an Ethernet physical layer and the network layer 2 is an Ethernet data link layer. The Ethernet physical layer and Ethernet data link layer may conform to the Open System Interconnection (OSI) reference model and IEEE specification 802.

Alternatively, the network layer 1 may be a Transmission Control Protocol/Internet Protocol (TCP/IP) transmission medium. In addition, the network layer 2 may be a TCP/IP Physical Protocol.

Figure 4:
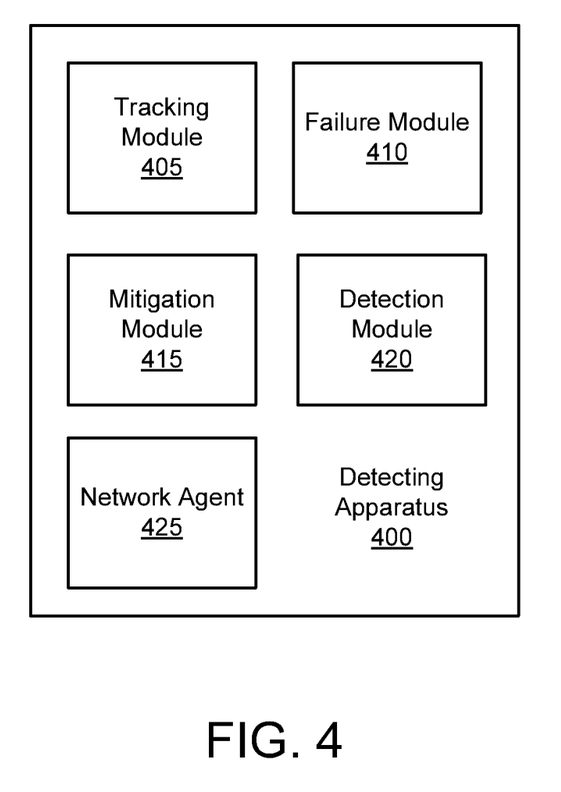
FIG. 4 is a schematic block diagram illustrating one embodiment of a detecting apparatus.

FIG. 4 is a schematic block diagram illustrating one embodiment of a detecting apparatus 400. The apparatus 400 may be embodied in one or more nodes 105 and/or one or more data processing devices 110 of the network 100 FIG. 1. The description of the apparatus 400 refers to FIGS. 1-3, like numbers referring to like elements. The apparatus includes a tracking module 405, a failure module 410, a mitigation module 415, and a detection module 420.

The tracking module 405, failure module 410, mitigation module 415, and detection module 420 may be embodied in hardware circuits, computer readable programs stored on a computer readable storage medium, and in a combination of hardware circuits and computer readable programs. In one embodiment, the hardware circuits are embodied in the communication hardware 315 of FIG. 3. In addition, the computer readable programs may be stored on the memory 310 and executed by the processor 305 of FIG. 3.

The detection module 420 detects a link failure of a network link 120. The link failure may be an intermittent network link failure. In one embodiment, the detection module 420 comprises an Ethernet physical layer. The Ethernet physical layer may be embodied in the communication hardware 315 FIG. 3. The Ethernet physical layer may look for a heartbeat message 210 each heartbeat time interval 215. In one embodiment, the heartbeat message 210 is a fast link pulse. If the heartbeat message 210 is not received within the heartbeat time interval 215, the detection module 420 may detect a link failure. In one embodiment, the link failure may be an Ethernet bouncing link condition.

The tracking module 405 may track the link failures of each network link 120 of the network 100. In one embodiment, the tracking module 405 tracks each link failure of each network link 120 over the specified time interval. The tracking module 405 may be embodied in an Ethernet data link layer of a node 105. In a certain embodiment, the tracking module 405 is embodied in a computer readable program stored on the memory 310 of a node 105.

In one embodiment, the tracking module 405 records a log entry for each link failure. The log entry may be stored in the memory 310 of the node 105. Alternatively, the log entry may be communicated to a network agent 425. The network agent 425 may reside on a data processing device 110 in communication with the network 100. In a certain embodiment, the network agent 425 may communicate with the network 100 through the external network 115. The tracking module 405 may time stamp each log entry. Alternatively, the tracking module 405 may record each log entry in a log entry bin for each specified time interval. In one embodiment, the tracking module 405 overwrites previous log entries after each specified time interval.

In an alternate embodiment, the tracking module 405 increments a counter for each link failure such as when a heartbeat message 210 is missed. The tracking module 405 may reset the counter after each specified time interval.

In one embodiment, the tracking module 405 and communicates link failure information to the failure module 410. The failure module 410 may be embodied in the network agent 425.

The failure module 410 determines the network link 120 is failing in response to a number of link failures exceeding a specified failure threshold. In one embodiment, the failure module 410 determines the network link 120 is failing if the counter exceeds the specified failure threshold. In an alternate embodiment, the failure module 410 analyzes the log entries of link failures for each network link 120. In one embodiment, the specified failure threshold is zero (0) link failures per the specified time interval. For example, if three heartbeat messages are typically sent each specified time interval, the specified failure threshold may be zero link failures per specified time interval, so that the failure module 410 determines the network link 120 is failing if one heartbeat message is not received.

The mitigation module 415 mitigates communications over the network link 120. In one embodiment, the mitigation module 415 mitigates communications over the network link 120 by removing the network link 120 from the network 100. In addition, the mitigation module 415 may route communications over an alternate network link 120. In one embodiment, the mitigation module 415 disables each port in communication with the network link 120 to remove the network link 120 from the network 100.

In one embodiment, the mitigation module 415 flags the network link 120 as a reduced performance network link. The network 100 may route communications to avoid each network link 120 flagged as a reduced performance network link unless no other option is available for communicating with a specified node 105.

Figure 5:
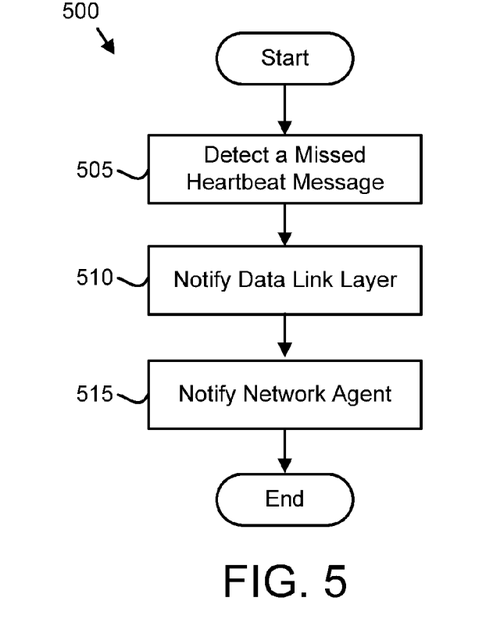
FIG. 5 is a schematic flow chart diagram illustrating one embodiment of a link failure detection method.

FIG. 5 is a schematic flow chart diagram illustrating one embodiment of a network link failure detection method 500. In one embodiment, the detection module 420 employs the network link failure detection method 500 to detect a link failure. The description of the method 500 refers to elements of FIGS. 1-4, like numbers referring to like elements. The method 500 may be performed by hardware logic, computer readable programs stored on a computer readable storage device such as the memory 310 and executing on a processor such as the processor 305, or any combination thereof.

The method 500 starts, and in one embodiment the network layer 1 detects 505 the missed heartbeat message 210. The network layer 1 may reset a heartbeat message flag and a heartbeat message timer at the beginning of a heartbeat time interval 215. The heartbeat time interval 215 may be less a specified time interval. The network layer 1 may set the heartbeat message flag when a heartbeat message 210 is received. If the heartbeat message flag is set before the heartbeat message timer times out the heartbeat time interval 215, the heartbeat message 210 is not missed. However, if the heartbeat message flag is not set before the heartbeat message timer times out the heartbeat time interval 215, the heartbeat message 210 is missed.

In an alternate embodiment, the network layer 2 detects 505 the missed heartbeat message 210. The network layer 2 may reset the heartbeat message flag and the heartbeat message timer at the beginning of a heartbeat time interval 215.

The network layer 1 may notify 510 the network layer 2 of the missed heartbeat message 210. In one embodiment, the network layer 1 writes a digital value to register to notify 510 the network layer 2 of the missed heartbeat message 210. Alternatively, the network layer 1 may assert an interrupt to notify 510 the network layer 2 of the missed heartbeat message 210.

The network layer 2 notifies 515 the network agent 425 of the missed heartbeat message 210 and method 500 ends. In one embodiment, the network agent 425 resides on the same node 105 as the network layer 2. Alternatively, the network agent 425 may reside on a node 105 distinct from the network layer 2. The network layer 2 may notify 515 the network agent 425 using an internet control message protocol message. In an alternate embodiment, the network layer 2 notifies 515 the network agent 425 using a set-link-info command.

Figure 6:
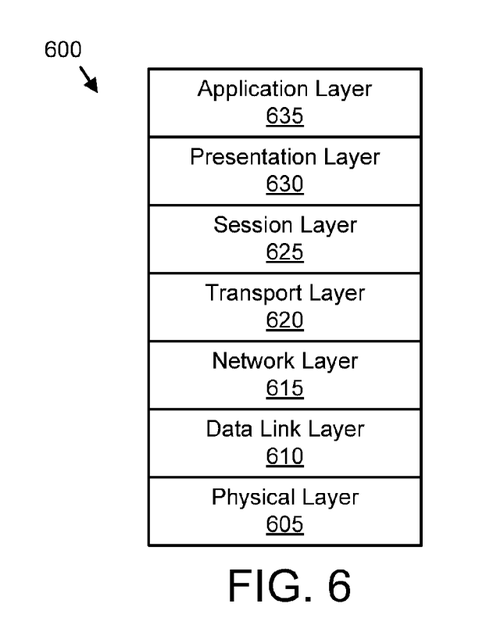
FIG. 6 is a schematic block diagram illustrating one embodiment of protocol layers.

FIG. 6 is a schematic block diagram illustrating one embodiment of protocol layers 600 of the network 100. The protocol layers 600 include a physical layer 605, a data link layer 610, a network layer 615, a transport layer 620, a session layer 625, a presentation layer 630, and an application layer 635. The description of the protocol layers 600 refers to elements of FIGS. 1-5, like numbers referring to like elements The protocol layers 600 may be for an Ethernet protocol. The physical layer 605 may be the Ethernet physical layer and the data link layer 610 may be the Ethernet data link layer. The application layer 635 may initiate communication of the message over the network 100. The presentation layer 630 may encrypt the message. The session layer 625 may coordinate communication of the message. The transport layer 620 may transmit complete messages. The network layer 615 may route the message across the network 100. The data link layer 610 may encode and decode the message. The physical layer 605 may send and receive the encoded message.

In an alternate embodiment, the protocol layers 600 are for the TCP/IP protocol. The physical layer 605 may be the TCP/IP transmission medium, the data link layer 610 may be a TCP/IP physical protocol, the network layer 615 may be a TCP/IP network protocol, the transport layer 620 may be TCP/IP TCP and UDP protocols, the session layer 625 may be a TCP/IP transport protocol, the presentation layer 630 may be a TCP/IP session protocol, and the application layer 635 may be a TCP/IP Application protocol.

In one embodiment, the network agent 425 resides in a layer selected from the group consisting of the data link layer 610, the network layer 615, the transport layer 620, the session layer 625, the presentation layer 630, and the application layer 635. In a certain embodiment, the network agent 425 resides in a layer selected from the group consisting of the session layer 625, the presentation layer 630, and the application layer 635.

Figure 7:
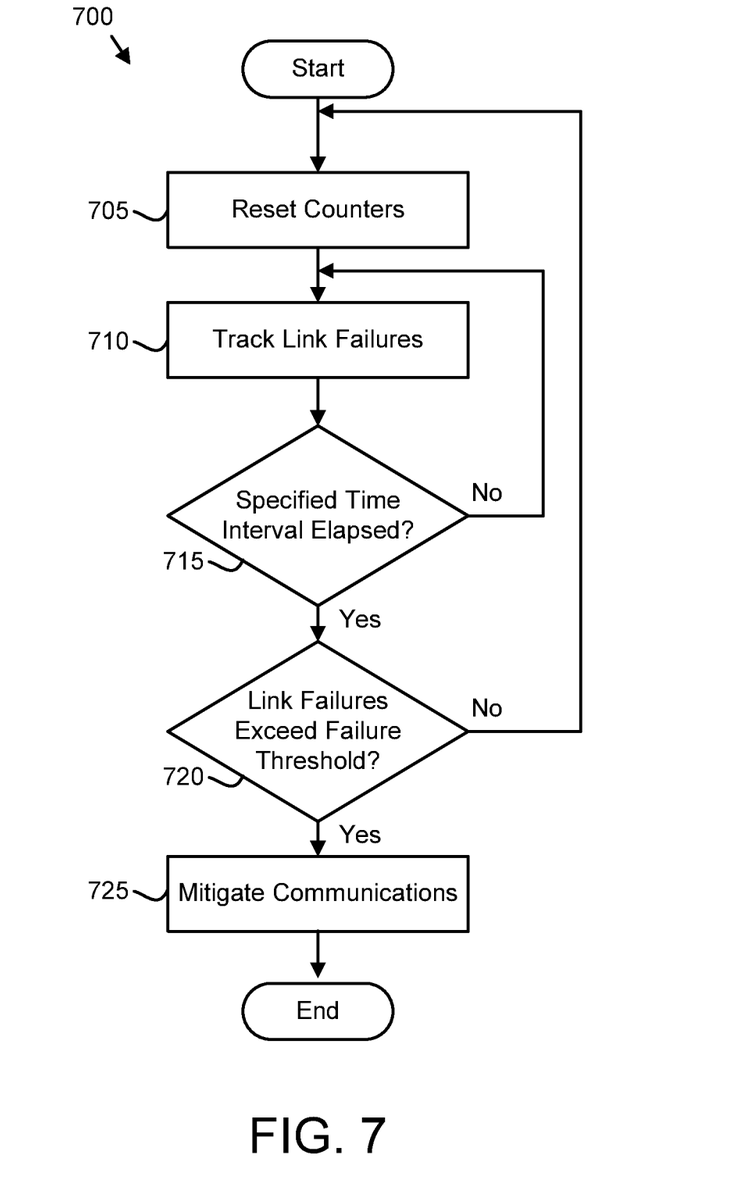
FIG. 7 is a schematic flow chart diagram illustrating one embodiment of an intermittent network link failure detection method.

FIG. 7 is a schematic flow chart diagram illustrating one embodiment of an intermittent network link failure detecting method 700. The method 700 may embody the functions of the tracking module 405, the failure module 410, the mitigation module 415, and the detection module 420 of FIG. 4. The description of the method 700 refers to elements of FIGS. 1-6, like numbers referring to like elements. The method 700 may be performed by hardware logic, computer readable programs stored on a computer readable storage device such as the memory 310 and executing on a processor such as the processor 305, or any combination thereof.

The method 700 starts, and in one embodiment the detection module 420 resets 705 one or more counters and timers. In one embodiment, the detection module 420 resets 705 a heartbeat message counter. The heartbeat message counter may count heartbeat messages 210 for a specified network link 120. In addition, the detection module 420 may reset a specified time interval timer. The specified time interval timer may time the specified time interval.

The tracking module 405 tracks 710 the link failures of a network link 120. In one embodiment, the tracking module 405 tracks 710 each link failure of each network link 120 of the network 100. In an alternate embodiment, the tracking module 405 tracks 710 link failures for one or more selected network links 120. For example, the tracking module 405 may track 710 link failures for one or more randomly selected first network links 120 for a first testing time interval and then track 710 link failures for one or more second network links 120 for a second testing time interval. Alternatively, the tracking module 405 may systematically track 710 link failures for each network link 120 in turn for a specified tracking time interval.

In one embodiment, the failure module 415 determines 715 if the specified time interval is elapsed. If the specified time interval is not elapsed, the tracking module 405 tracks 710 the link failures of a network link 120. If the specified time interval is elapsed, the failure module 415 determines 720 if the network link 120 is failing in response to a number of link failures exceeding a specified failure threshold.

In one embodiment, the specified failure threshold is zero link failures per the specified time interval. For example, the specified failure threshold may be 0 and/or 1 failed heartbeat messages 210 per specified time interval. Thus, for example, if there is one link failure at a network link 120 followed by one or more successfully received heartbeat messages 210, the failure module 415 may still determine that the network link 120 is failing.

In one embodiment, the specified failure threshold is set in response to a service level. For example, if the service level is a high service level, the specified failure threshold may be set to tolerate no intermittent failures. Alternatively, if the service level is a low service level the specified failure threshold may be set to allow on occasional intermittent failure of the network link 120.

In one embodiment, the specified failure threshold t is calculated using Equation 1, where k is a non-zero constant, s is a service level between 0 and 100%, and n is a number of heartbeat messages 210 per specified time interval.

$$t = ksn \qquad \text{Equation 1}$$

If the failure module 415 determines 720 of the number of link failures during the specified time interval does not exceed the specified failure threshold, the detection module 420 resets 705 the counters and timers. If the failure module 415 determines 720 that the number of link failures during the specified time interval exceeds the specified failure threshold, the mitigation module 415 mitigates 725 communications over the network link 120 and the method 700 ends.

The mitigation module 415 may mitigate 725 communications over the network link 120 by removing the network link 120 from the network 100. In one embodiment, the mitigation modules 415 employs spanning tree protocol to remove the network link 120 from the network 100. Alternatively, the mitigation module 415 may mitigate 725 communications over the network link 120 by communicating a removal notice to remove the network link 120 from the network 100.

Figure 8:
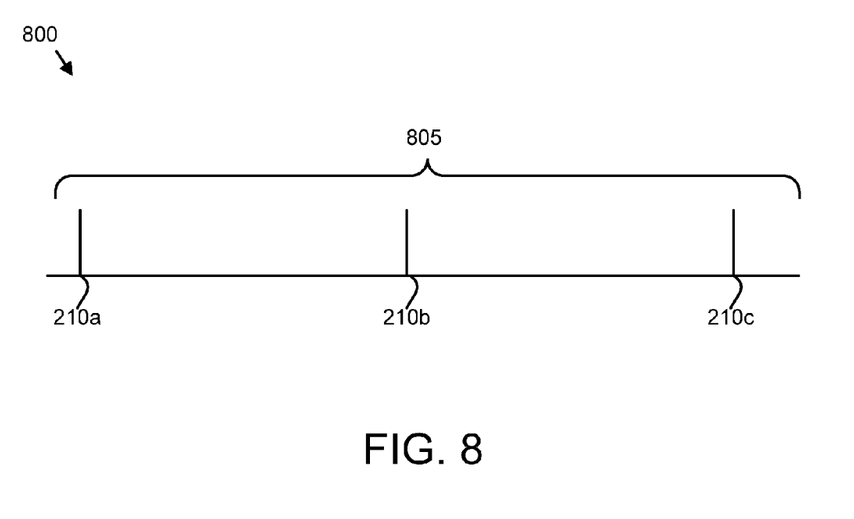
FIG. 8 is a schematic diagram illustrating one embodiment of a timeline of heartbeat messages.

FIG. 8 is a schematic diagram illustrating one embodiment of a timeline 800 of heartbeat messages 210. The timeline 800 may be the timeline 200 of FIG. 2, but only showing the heartbeat messages 210. The description of the timeline 800 refers to elements of FIGS. 1-7, like numbers referring to like elements. The timeline 800 shows the specified time interval 805.

In the depicted embodiment, the three (3) heartbeat messages 210 are sent during the specified time interval 805. In one embodiment, if three (3) heartbeat messages 210 are received each specified time interval 805, the failure module 415 does not determine 720 the network link 120 is failing.

Figure 9:
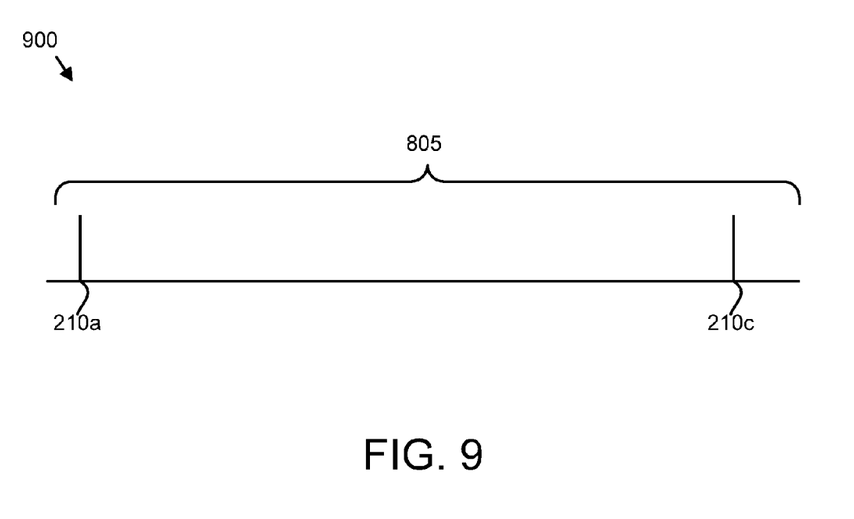
FIG. 9 is a schematic diagram illustrating one alternate embodiment of a timeline of heartbeat messages.

FIG. 9 is a schematic diagram illustrating one alternate embodiment of a timeline 800 of heartbeat messages 210. The timeline 800 is the timeline of FIG. 8. The description of the timeline 800 refers to elements FIGS. 1-8, like numbers referring to like elements.

In the depicted embodiment, only two (2) heartbeat messages 210 are received during the specified time interval 805. The detection module 420 detects a link failure as one heartbeat message 210 was not received. The tracking module 405 tracks 710 one (1) link failure. If, for example, the link failure threshold is 0, the failure module 410 may determine 720 that the network link 120 is failing in response to the number of link failures exceeding the specified failure threshold. The mitigation module 415 may mitigate communications over the network link 120 by removing the network link 120 from the network 100.

Thus if the network link 120 is intermittently failing, the intermittent failure is still detected. As a result, the network 100 may be reconfigured to use an alternate network link 120. By removing intermittently failing network links 120 from the network 100, the performance and reliability of the network 100 may be improved.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detecting intermittent network link failures, the apparatus comprising:
    a non-tangible computer readable storage medium storing a computer readable program;
    a processor executing the computer readable program, the computer readable program comprising:
        a detection module detecting link failures of a network link of a network by notifying an Ethernet data link layer of each link failure from an Ethernet physical layer, the Ethernet data link layer notifying a network agent residing at the data link layer of the link failure, and the network agent logging the link failure;
        a tracking module tracking the link failures over a specified time interval, wherein a link failure comprises missing a heartbeat message during a heartbeat time interval;
        a failure module determining the network link is failing in response to a number of link failures during the specified time interval exceeding a specified failure threshold, wherein the specified failure threshold t is calculated from a service level as $t=ksn$ wherein k is a non-zero constant, s is the service level, and n is a number of heartbeat messages during the specified time interval; and
        a mitigation module mitigating communications over the network link by removing the failing network link from the network.

2. The apparatus of claim 1, wherein the specified failure threshold is zero link failures per the specified time interval.

3. The apparatus of claim 1, wherein the network employs a spanning tree protocol to organize a loop-free topology.

4. A computer program product comprising a non-tangible computer readable storage medium storing a computer readable program executing on a processor to perform operations for detecting intermittent network link failures, the operations of the computer program product comprising:
    tracking link failures of a network link of a network over a specified time interval by notifying an Ethernet data link layer of each link failure from an Ethernet physical layer, the Ethernet data link layer notifying a network agent residing at the data link layer of the link failure, and the network agent logging the link failure, wherein a link failure comprises missing a heartbeat message during a heartbeat time interval;
    determining the network link is failing in response to a number of link failures during the specified time interval exceeding a specified failure threshold, wherein the specified failure threshold t is calculated from a service level as $t=ksn$ wherein k is a non-zero constant, s is the service level, and n is a number of heartbeat messages during the specified time interval; and
    mitigating communications over the network link by removing the failing network link from the network.

5. The computer program product of claim 4, wherein the specified failure threshold is zero link failures per the specified time interval.

6. The computer program product of claim 4, further comprising detecting each link failure.

7. The computer program product of claim 4, wherein the network agent is notified using an internet control message protocol message.

8. The computer program product of claim 4, further comprising communicating a removal notice to remove the network link from the network.

9. A method for detecting intermittent network link failures, the method comprising:
    tracking link failures of a network link of a network over a specified time interval by notifying an Ethernet data link layer of each link failure from an Ethernet physical layer, the Ethernet data link layer notifying a network agent residing at the data link layer of the link failure, and the network agent ligging the link failure, wherein a link failure comprises missing a heartbeat message during a heartbeat time interval;
    determining the network link is failing in response to a number of link failures during the specified time interval exceeding a specified failure threshold, wherein the specified failure threshold t is calculated from a service level as $t=ksn$ wherein k is a non-zero constant, s is the service level, and n is a number of heartbeat messages during the specified time interval; and mitigating communications over the network link by removing the failing network link from the network.

10. The method of claim 9, wherein the specified failure threshold is zero link failures per the specified time interval.

11. A system to detect intermittent network link failures, the system comprising:

a network;

a data processing device in communication with network, the data processing device comprising:

a tracking module tracking link failures of a network link of the network over a specified time interval by notifying an Ethernet data link layer of each link failure from an Ethernet physical layer, the Ethernet data link layer notifying a network agent residing at the data link layer of the link failure, and the network agent logging the link failure, wherein a link failure comprises missing a heartbeat message during a heartbeat time interval;

a failure module determining the network link is failing in response to a number of link failures during the specified time interval exceeding a specified failure threshold, wherein the specified failure threshold t is calculated from a service level as t =ksn wherein k is a non-zero constant, s is the service level, and n is a number of heartbeat messages during the specified time interval; and a mitigation module mitigating communications over the network link by removing the failing network link from the network.

12. The system of claim 11, wherein the network is an Ethernet network.

13. The system of claim 12, wherein the Ethernet network is selected from a group consisting of a one Gigabit Fiber Channel over Ethernet (FCoE) network, a ten Gigabit FCoE network, an Internet Small Computer System Interface (iSCSI) network, a Hyper Small Computer System Interface (HyperSCSI) network, and an Advanced Technology Attachment (ATA) over Ethernet (AoE) network.

14. The system of claim 12, wherein the Ethernet network employs a transport medium selected from the group consisting of a fiber optic transport medium, a copper transport medium, and a wireless transport medium.

* * * * *